US005608835A

United States Patent [19]
Ono et al.

[11] Patent Number: 5,608,835
[45] Date of Patent: Mar. 4, 1997

[54] IMAGE FIBER WITH REDUCED FLARE

[75] Inventors: Katsuya Ono, Hino; Kimihiko Nishioka, Hachioji, both of Japan

[73] Assignee: Olympus Optical Co., Ltd., Tokyo, Japan

[21] Appl. No.: 281,557

[22] Filed: Jul. 28, 1994

[30] Foreign Application Priority Data

Oct. 19, 1993 [JP] Japan .................. 5-260940

[51] Int. Cl.$^6$ ........................... G02B 6/02
[52] U.S. Cl. ........................... 385/126
[58] Field of Search ........................... 385/122–127, 385/141, 147

[56] References Cited

U.S. PATENT DOCUMENTS 4,397,524  8/1983  Yoshimura et al. .............. 385/141 X
4,615,583  10/1986  Tsuno et al. .............. 385/126
4,833,207  5/1989  Kinga et al. .............. 385/145
4,904,053  2/1990  Kinaga et al. .............. 385/145

FOREIGN PATENT DOCUMENTS 59-998402  7/1984  Japan .
2123904  10/1990  Japan .

*Primary Examiner*—Akm E. Ullah
*Attorney, Agent, or Firm*—Cushman, Darby & Cushman IP Group of Pillsbury Madison & Sutro LLP

[57] ABSTRACT

An image fiber is provided with an image transmitting portion including a plurality of cores and a cladding surrounding the cores; a jacket layer higher in refractive index than the cladding, covering the periphery of the image transmitting portion; and a coating layer higher in refractive index than the cladding, covering the periphery of the jacket layer. The image fiber, integrally constructed in this way, allows light propagating through the cladding to be effectively eliminated, and thus fails to produce flare.

13 Claims, 4 Drawing Sheets

MONITOR SCANNING LINE

IMAGE FIBER WITH REDUCED FLARE

BACKGROUND OF THE INVENTION

1. Field of the Invention

This invention relates to an image fiber applied to an endoscope or the like and, in particular, to an improvement of an integrated image fiber as it is usually called, in which a plurality of fiber elements, after being inserted in a jacket pipe used as a jacket layer, are drawn together to thereby have a common cladding in common.

2. Description of Related Art

Integrated image fibers of this type, when compared with flexible image guides known as fibers using acid-soluble glass, have the advantages that the ratio of the cross sectional area occupied by cores having a common cladding to that of the cladding (which is hereinafter referred to as a core area ratio) can be increased and when the image fiber is reduced to a very small diameter, fiber elements constituting the cores are hard to break. The integrated image fibers have thus found relatively many applications in non-flexible endoscopes and flexible endoscopes of very small diameters used for blood vessels, for instance.

The integrated image fibers are constructed so that an image transmitting portion composed of a plurality of cores and a cladding surrounding the cores transmits an image formed at the entrance end of the image fiber to the exit end thereof. In this construction, the core area ratio is usually set at approximately 20–50%.

In the integrated image fibers mentioned above, when advances are made in a reduction of the outer diameter and a high density of pixels of the image to be transmitted, spaces between the fiber elements constituting the cores are necessarily diminished. Hence, there is the need to prevent the generation of cross talk of light transmitted through the cores, and the thickness of the cladding with which the cores are covered must be ensured to some extent. This tends to increase the ratio of the cross sectional area occupied by the cladding to that of the image fiber (namely, a cladding area ratio). Since, on the other hand, light incident on the cladding becomes flare which deteriorates the quality of image at the exit end, it is necessary to eliminate the light propagating through the cladding as far as possible.

In the case of the prior art, to solve these problems, for example, Japanese Utility Model Preliminary Publication No. Sho 59-98402 discloses the method of removing flare attributable to cross talk by defining the refractive indices of the cores, cladding, and jacket layer of an image fiber. Further, the techniques of impregnating the outermost coating layer with a light absorption material are disclosed by Japanese Utility Model Preliminary Publication No. Hei 2-123904 and U.S. Pat. No. 4,615,583.

The prior art described above, however, cannot necessarily make an effective elimination of flare involved in the light propagating through the cladding in an image fiber which is relatively large in outer diameter or relatively small in length. Thus, endoscopes using such image fibers possess the drawback of remarkably degrading the quality of an available observation.

SUMMARY OF THE INVENTION

It is, therefore, an object of the present invention to provide an integrated image fiber which is capable of eliminating light propagating through the cladding as far as possible.

In order to achieve this object, the image fiber according to the present invention is provided with an image transmitting portion composed of a plurality of cores and a cladding surrounding the cores, a jacket layer which is higher in refractive index than the cladding and covers the periphery of the image transmitting portion, and a coating layer which is higher in refractive index than the cladding and covers the periphery of the jacket layer.

According to another aspect of the present invention, the image fiber is provided with an image transmitting portion composed of a plurality of cores and a cladding surrounding the cores, a jacket layer which is higher in refractive index than the cladding and covers the periphery of the image transmitting portion, and a coating layer which covers the periphery of the jacket layer and contains a light absorption material.

In this way, the image fiber is constructed so that the refractive index of the jacket layer is higher than that of the cladding and the coating layer has the light absorption material, thereby eliminating light propagating through the cladding.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, reference is made to the general structure and function of the image fiber according to the present invention.

Figure 1:
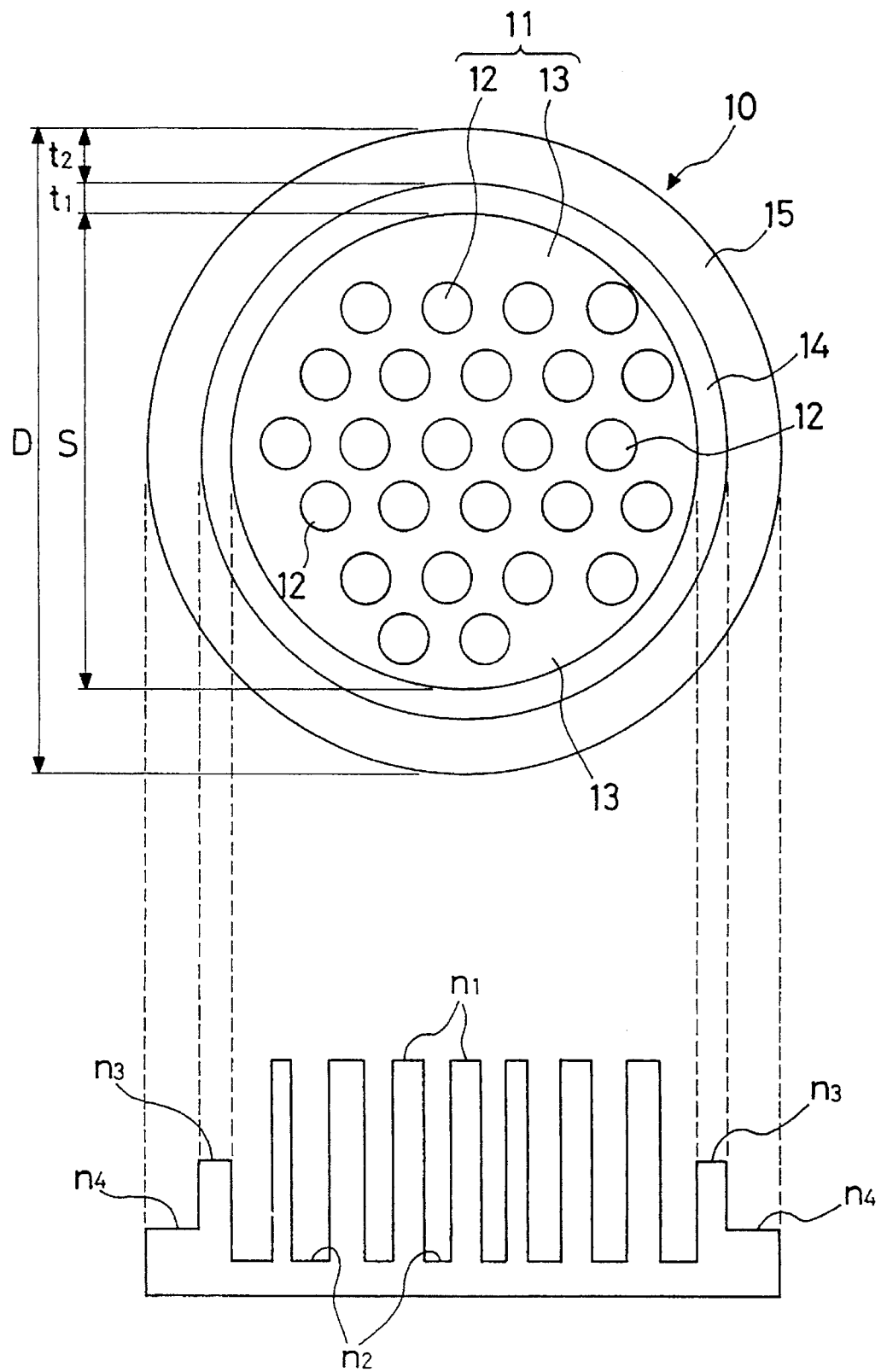
FIG. 1 is a cross sectional view diagrammatically showing an example, together with a graph of refractive index, of an image fiber according to the present invention.

As shown in FIG. 1, an image fiber 10 of the present invention is constructed integral with an image transmitting portion 11 composed of a plurality of cores 12 and a cladding 13 surrounding the cores 12, a jacket layer 14 which is higher in refractive index than the cladding 13 and covers the periphery of the image transmitting portion 11, and a coating layer 15 which is higher in refractive index than the cladding, contains a light absorption material, and covers the periphery of the jacket layer 14. In FIG. 1, reference symbol D designates the outer diameter of the integrated image fiber 10; S the outer diameter of the image transmitting portion 11, namely, of the cladding 13 enclosing the cores 12; $t_1$ the thickness of the jacket layer 14; and $t_2$ the thickness of the coating layer 15. Symbol $n_1$ represents the refractive index of the cores 12; $n_2$ the refractive index of the cladding 13; $n_3$ the refractive index of the jacket layer 14; and $n_4$ the refractive index of the coating layer 15.

In the integrated image fiber 10 constructed as mentioned above, light incident on the entrance end of the cladding 13 propagates through the cladding 13 to reach the interface between the cladding 13 and the jacket layer 14. In this case, if the refractive index $n_3$ of the jacket layer 14 is lower than the refractive index $n_2$ of the cladding 13, the light incident on the cladding 13 with a smaller numerical aperture (angle) than is determined by the refractive indices $n_2$ and $n_3$ will be totally reflected. Consequently, the light propagates through the cladding 13 and becomes flare at its exit end. Thus, when the refractive index $n_3$ of the jacket layer 14 is made greater than the refractive index $n_2$ of the cladding 13, all the light incident on the cladding 13 can be made to enter the jacket layer 14.

If the refractive index $n_4$ of the coating layer 15 is smaller than the refractive index $n_2$ of the cladding 13, part of the light will undergo total reflection at the interface between the jacket layer 14 and the coating layer 15 and likewise becomes flare. Where the coating layer 15 contains a light absorption material, however, the intensity of the light is attenuated when the light is reflected at the interface. Hence, if the image fiber 10 is relatively long, flare will be completely reduced by the time the incident light arrives at the exit end. Further, if the refractive index $n_4$ of the coating layer 15 is higher than the refractive index $n_2$ of the cladding 13, all the incident light on the cladding 13 will enter the coating layer 15 and will be absorbed by the light absorption material of the coating layer 15. The result is that flare is favorably eliminated.

Figure 2:
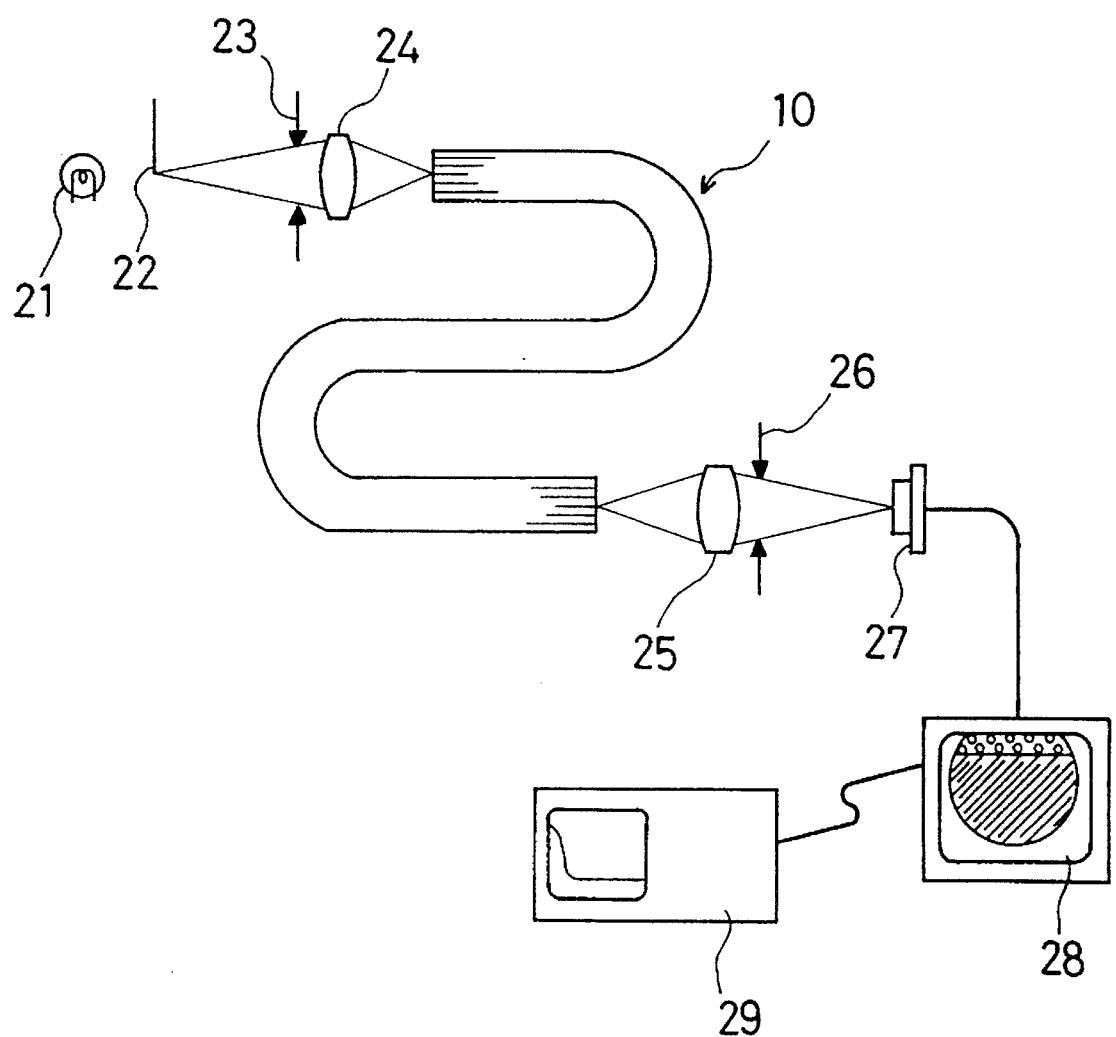
FIG. 2 is an explanatory view schematically showing the arrangement of an experimental system in which the image fiber of FIG. 1 is used to measure flare.
Figure 3:
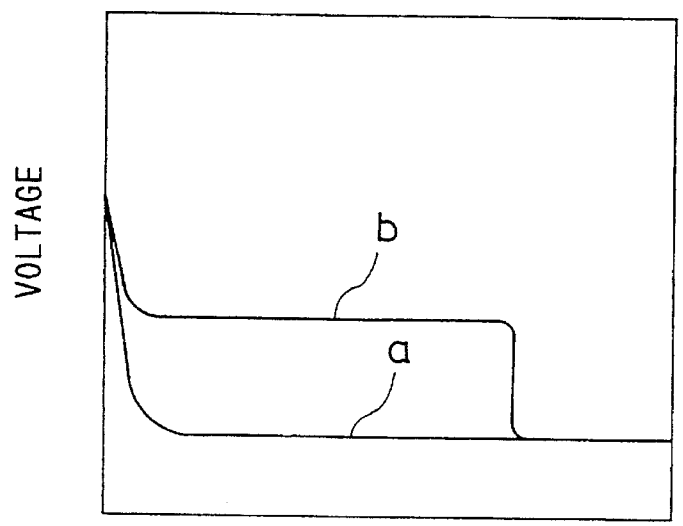
FIG. 3 is a graph showing the result of flare measured by an oscilloscope in the experimental system of FIG. 2.

For the integrated image fiber 10 according to the present invention, an experimental system shown in FIG. 2 is used to measure flare. The result of this measurement is shown in FIG. 3. In the experimental system of FIG. 2, light coming from a light source 21 through a knife edge 22 is introduced through an aperture stop 23 and an objective lens 24 to the entrance end of the integrated image fiber 10 (a core area ratio of 28% and a length of 1.5 m). Subsequently, the light transmitted to its exit end irradiates a CCD camera 27 through a photographic lens 25 and an aperture stop 26 and is detected. The detected light is monitored on the screen of a TV monitor 28 and the value of its flare is measured by an oscilloscope 29.

In the result of measurement of FIG. 3 thus available, a characteristic curve a shows the measured value of flare of the image fiber 10 of the present invention, while a characteristic curve b shows that of the image fiber of prior art in which the jacket layer is lower in refractive index than the cladding. It is therefore seen that the image fiber 10 of the present invention is materially reduced in flare.

On the other hand, when a glass material which is lower in transmittance than the cores 12 is used for the cladding 13, light propagating through the cladding 13 is subjected to complete attenuation by the time it reaches the exit end. However, light propagating through the cores 12 produces blurring in the cladding 13 and is also subjected to great attenuation, with an unfavorable result that an image for observation becomes dark.

In the case where the jacket layer 14 is impregnated with the light absorption material, it is also possible to eliminate flare. If, however, the image fiber is such that each spacing between fiber elements constituting the cores 12 is several micrometers, the thickness of the cladding 13 will be at least two or three times a wavelength. This raises the problem that light blurred from the cores 12 lying on the periphery of the image transmitting portion 11 is also attenuated in the jacket layer 14 and the periphery of the image for observation becomes dark. Thus, materials of good transmittance are desired for the cladding and the jacket layer.

Further, if the refractive index $n_3$ of the jacket layer 14 is excessively higher, the light of the cores 12 in the outermost layer of the image transmitting portion 11 will radiate into the jacket layer 14 and may cause a reduction in contrast.

Hence, in order to avoid these problems, it is only necessary that the refractive index $n_1$ of the cores 12, the refractive index $n_2$ of the cladding 13, and the refractive index $n_3$ of the jacket layer 14 satisfy a relation:

$$n_1 > n_3 > n_2 \tag{1}$$

Since in this case the amount of reflection of light at the jacket layer 14 decreases as the difference between the refractive index $n_3$ of the jacket layer 14 and the refractive index $n_1$ of the cores 12 increases, it is particularly desirable to satisfy a condition:

$$n_1 - n_3 > n_3 - n_2 \tag{2}$$

Further, flare of the light entering the cladding 13 needs to be attenuated by the coating layer 15. If the attenuation of the light by the coating layer 15 is slight, a good elimination of flare cannot be made. Thus, the greater the attenuation, the better the elimination of flare. For example, where resin materials for forming the coating layer 15 are impregnated with carbon, it is favorable that a carbon content $\alpha$ (unit; Wt %) satisfies a condition:

$$0.1 \text{ Wt \%} < \alpha < 8 \text{ Wt \%} \tag{3}$$

Specifically, when the coating layer 15 contains at least 0.1 Wt % carbon or a light absorption material bringing about the function and effect equivalent to at least 0.1 Wt % carbon this is more favorable for the image fiber 10.

Although in this case carbon is used as the light absorption material, any substance may be used if the coating layer brings about light absorption effect equivalent to carbon. Also, the layer between the coating layer 15 constituting a light absorption layer and the cladding 13 may well have a multilayered structure. In this instance, if all the multiple layers have higher refractive indices than the cladding 13, the flare elimination effect is identical with the case of a single jacket layer.

The amount of attenuation of flare, on the other hand, is related to the length of the image fiber 10 constructed as mentioned above and the diameter of the image transmitting portion 11. That is, if the image fibers 10 having the same length are different in the diameter of the image transmitting portion 11, the number of reflections of light at the coating layer 15 is also different. Consequently, the amount of attenuation of flare changes. For example, where the diameter of the image transmitting portion 11 is extremely large compared with the length of the image fiber 10, an intended flare elimination becomes difficult. However, flare can be eliminated to such an extent that there is no problem in practical use, if a length L of the image fiber 10 and a diameter S of the image transmitting portion 11 satisfy a condition:

$$L/S > 200 \quad (4)$$

Further, the flare can be nearly perfectly eliminated if the length L of the image fiber 10 and the diameter S of the image transmitting portion 11 satisfy a condition:

$$L/S > 1000 \quad (5)$$

There is also the problem that if the carbon content $\alpha$ excessively increases, the strength of the coating layer 15 will decrease, or when resin materials of ultraviolet curing type are used, ultraviolet light is absorbed by carbon to be impregnated and the curing of resins is prevented. Conversely, if the carbon content $\alpha$ is extremely limited, there is the fear that flare cannot be completely removed in a relatively short image fiber with a length of about 5 m or less, applied to medical endoscopes in particular.

Thus, in order to favorably eliminate flare and maintain a sufficient layer strength, it is desirable that the carbon content $\alpha$ satisfies a condition:

$$2 \text{ Wt \%} < \alpha < 5 \text{ Wt \%} \quad (6)$$

Even where Eq. (4) is satisfied but Eq. (5) is not, it is only necessary to satisfy Eq. (6). Even when the refractive index $n_4$ of the coating layer 15 is lower than the refractive index $n_2$ of the cladding 13, the lower value of Eq. (6) is satisfied, and thereby the intensity of reflected light from the interface between the jacket layer 14 and the coating layer 15 can be completely attenuated.

Next, it is desirable that a thickness $t_2$ of the coating layer 12 satisfies a condition:

$$10 \text{ } \mu\text{m} < t_2 \quad (7)$$

Specifically, if the thickness $t_2$ of the coating layer 15 is smaller than the lower value of Eq. (7), the effect of a protective layer will be lessened to yield a problem in durability, decreasing the amount of attenuation of flare.

It is desirable that a thickness $t_1$ of the jacket layer 14 satisfies a condition:

$$5 \text{ } \mu\text{m} < t_1 \quad (8)$$

That is, if the thickness $t_1$ of the jacket layer 14 is smaller than the lower limit value of Eq. (8), the durability of the layer itself will be deteriorated, and as previously mentioned, there is the possibility of producing the influence of light absorption on the coating layer 15 in the cores 12 of the outermost layer of the image transmitting portion 11.

Further, for an outer diameter D of the image fiber 10, it is desirable that the thickness $t_1$ of the jacket layer 14 and the thickness $t_2$ of the coating layer 15 satisfy a condition:

$$t_1 + t_2 < 0.1 \text{ } D \quad (9)$$

That is, if the sum of thicknesses of the jacket layer 14 and the coating layer 15, $t_1 + t_2$, exceeds the upper limit value of Eq. (9), the ratio of the outer diameter S of the image transmitting portion 11 to the outer diameter D of the image fiber 10 will diminish, and it is unfavorable to use the image fiber in limited space as in endoscopes.

Figure 4:
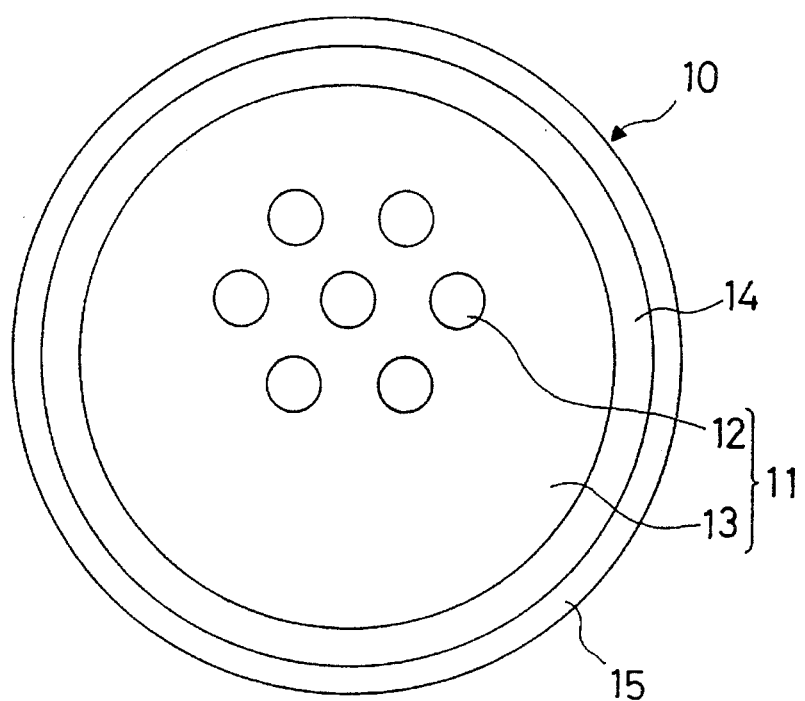
FIG. 4 is a cross sectional view diagrammatically showing the structure of the image fiber in first to third embodiments and sixth and seventh embodiments of the present invention.
Figure 5:
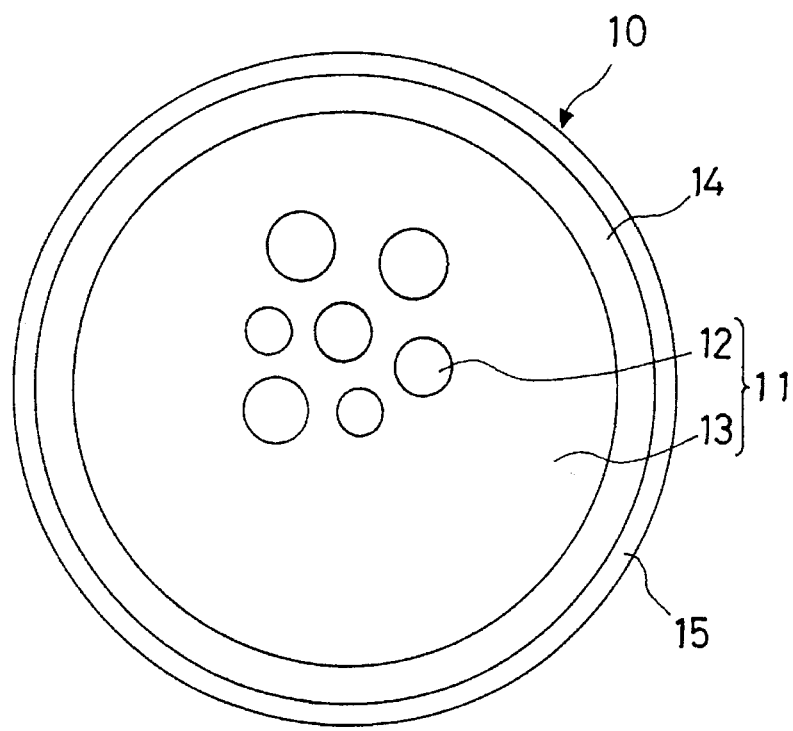
FIG. 5 is a cross sectional view diagrammatically showing the structure of the image fiber in a fourth embodiment of the present invention.
Figure 6:
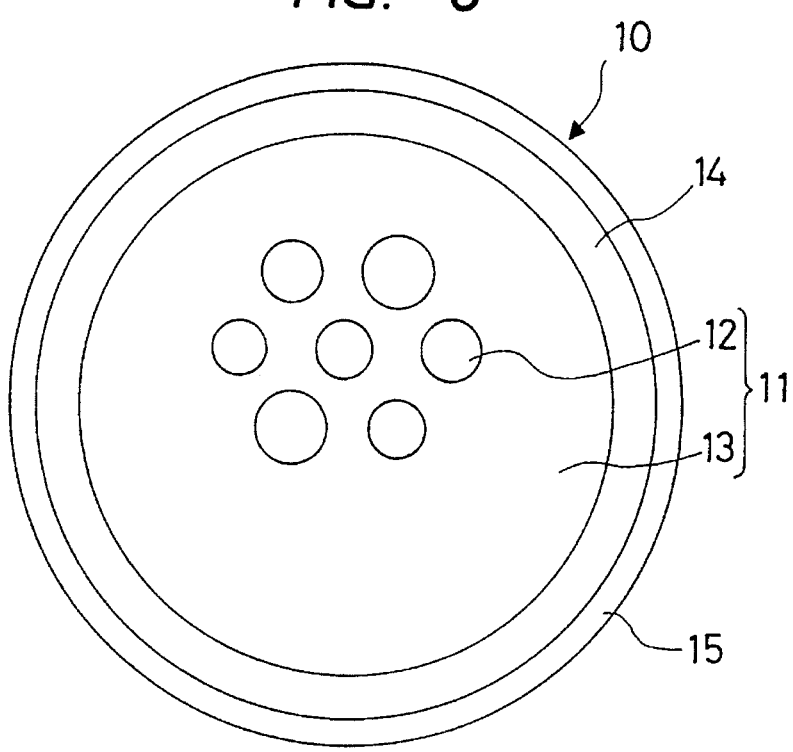
FIG. 6 is a cross sectional view diagrammatically showing the structure of the image fiber in a fifth embodiment of the present invention.

Referring to FIGS. 4 to 6, the embodiments of the image fiber according to the present invention will be explained in detail below.

First Embodiment

In the first embodiment shown in FIG. 4, the cores 12 have a refractive index of 1.5963 and are set so that the spacing between the fiber elements is about 3.8 µm, the cladding 13 is set to a refractive index of 1.5177, the jacket layer 14 is set to a refractive index of 1.53, and the coating layer 15 has a refractive index of 1.5217 and uses urethane acrylete with a carbon content of 4.5 Wt %. The image transmitting portion 11 is approximately 210 µm in diameter, the jacket layer 14 is 224 µm in diameter, and the coating layer 15 is 280 µm in outer diameter. The number of fiber elements constituting the cores 12 is 3000. The core area ratios are about 28% and 32%, each for lengths of 1.5 m and 3.5 m, with a total of four kinds of image fibers.

The measurements of flare on the foregoing image fibers show that flare is favorably eliminated in any image fiber.

Second Embodiment

The second embodiment has the same construction as the first embodiment shown in FIG. 4, with the exception that the jacket layer 14 is set to a refractive index of 1.574. This embodiment also uses four kinds of image fibers.

The measurements of flare on the foregoing image fibers show that flare is favorably eliminated in any image fiber.

Third Embodiment

The third embodiment has the same construction as the first embodiment shown in FIG. 4, with the exception that the refractive index of the jacket layer 14 is set at 1.595. This embodiment also uses four kinds of image fibers.

The measurements of flare on the foregoing image fibers show that flare is favorably eliminated in any image fiber.

Fourth Embodiment

The fourth embodiment shown in FIG. 5 uses two kinds of image fibers in the same way as in the first embodiment, with the exception that five kinds of elements (a core diameter (µm)/a cladding diameter (µm) in each element is equal to 255/400, 243/380, 230/360, 217/340, and 204/320), 600 elements for each, are used in which the diameters of the cores 12 and the cladding 13 vary in the range of nearly 5.2–6.2%, the core area ratio is about 40%, and the spacing between the fiber elements is set to about 3.4–4.2 µm.

The measurements of flare on the foregoing image fibers show that flare is favorably eliminated in either image fiber.

Fifth Embodiment

The fifth embodiment shown in FIG. 6 uses two kinds of image fibers in the same way as in the first embodiment, with the exception that five kinds of elements (a core diameter (µm)/a cladding diameter (µm) in each element is equal to 260/360, 245/360, 230/360, 215/360, and 200/360), 600 elements for each, are used in which the diameters of the cores 12 vary in the range of nearly 6.1–7.5% and those of the cladding 13 are the same, the core area ratio is nearly 40%, and the spacing between the fiber elements is set to about 3.8 µm.

The measurements of flare on the foregoing image fibers show that flare is favorably eliminated in either image fiber.

Sixth Embodiment

The sixth embodiment employs the same image fiber as in the first embodiment shown in FIG. 4, with the exception that the core area ratio is nearly 42%, the spacing between the fiber elements is set to nearly 6.2 μm, the image transmitting portion 11 has a diameter of about 730 μm, the jacket layer 14 has a diameter of about 744 μm, the coating layer 15 has an outer diameter of about 800 μm, the number of fiber elements constituting the cores 12 is nearly 16000, and the fiber length is nearly 0.5 m.

The measurement of flare on the foregoing image fiber shows that flare is favorably eliminated in the image fiber.

Seventh Embodiment

In the seventh embodiment shown in FIG. 4, the cores 12 have a refractive index of 1.5963 and are set so that the spacing between the fiber elements is about 3.8 μm, the cladding 13 is set to a refractive index of 1.5177, the jacket layer 14 is set to refractive index 1.574, and the coating layer 15 has a refractive index of 1.5217 and uses urethane acrylete with a carbon content of 2 Wt %. The image transmitting portion 11 is approximately 210 μm in diameter, the jacket layer 14 is 224 μm in diameter, and the coating layer 15 is 280 μm in outer diameter. The number of fiber elements constituting the cores 12 is 3000, and the core area ratio is about 31.4% for lengths of 1.5 m and 3.5 m, with a total of two kinds of image fibers.

The measurements of flare on the foregoing image fibers show that flare is favorably eliminated in any image fiber.

What is claimed is:

1. An image fiber comprising:
   an image transmitting portion including a plurality of cores and a cladding surrounding said cores;
   a jacket layer higher in refractive index than said cladding, covering a periphery of said image transmitting portion; and
   a coating layer higher in refractive index than said cladding, covering a periphery of said jacket layer,
   said image fiber, satisfying a condition $$L/S > 200$$

where L is a length of said image fiber and S is a diameter of said image transmitting portion.

2. An image fiber comprising:
   an image transmitting portion including a plurality of cores and a cladding surrounding said cores;
   a jacket layer higher in refractive index than said cladding, covering a periphery of said image transmitting portion; and
   a coating layer higher in refractive index than said cladding, covering a periphery of said jacket layer,
   said image fiber satisfying a condition:

$$10 \, \mu m < t2$$

where $t2$ is a thickness of said coating layer.

3. An image fiber comprising:
   an image transmitting portion including a plurality of cores and a cladding surrounding said cores;
   a jacket layer higher in refractive index than said cladding, covering a periphery of said image transmitting portion; and
   a coating layer higher in refractive index than said cladding, covering a periphery of said jacket layer,
   said image fiber satisfying a condition $$5 \, \mu m < t1$$

where $t1$ is a thickness of said jacket layer.

4. An image fiber comprising:
   an image transmitting portion including a plurality of cores and a cladding surrounding said cores;
   a jacket layer higher in refractive index than said cladding, covering a periphery of said image transmitting portion; and
   a coating a layer higher in refractive index than said cladding, covering a periphery of said jacket layer,
   said image fiber satisfying a condition:

$$t1 + t2 < 0.1 \, D$$

where $t1$ is a thickness of said jacket layer, $t2$ is a thickness of said coating layer, and D is an outer diameter of said image fiber.

5. An image fiber comprising:
   an image transmitting portion including a plurality of cores and a cladding surrounding said cores;
   a jacket layer higher in refractive index than said cladding, covering a periphery of said image transmitting portion; and
   a coating layer higher in refractive index than said cladding, covering a periphery of said jacket layer, wherein said coating layer contains a light absorption material,
   said image fiber satisfying a condition:

$$0.1 \, Wt \, \% < \alpha < 8 \, Wt \, \%$$

where $\alpha$ is a carbon content (Wt %).

6. An image fiber comprising:
   an image transmitting portion including a plurality of cores and a cladding surrounding said cores;
   a jacket layer higher in refractive index than said cladding, covering a periphery of said image transmitting portion; and
   a coating layer covering a periphery of said jacket layer, impregnated with a light absorption material,
   said image fiber satisfying a condition:

$$L/S > 200$$

where L is a length of said image fiber and S is a diameter of said image transmitting portion.

7. An image fiber comprising:
   an image transmitting portion including a plurality of cores and a cladding surrounding said cores;
   a jacket layer higher in refractive index than said cladding, covering a periphery of said image transmitting portion; and
   a coating layer covering a periphery of said jacket layer, impregnated with a light absorption material,
   said fiber satisfying a condition:

$$10 \, \mu m < t2$$

where t2 is a thickness of said coating layer.

8. An image fiber comprising:
an image transmitting portion including a plurality of cores and a cladding surrounding said cores;
a jacket layer higher in refractive index than said cladding, covering a periphery of said image transmitting portion; and
a coating layer covering a periphery of said jacket layer, impregnated with a light absorption material,
said image fiber satisfying a condition:

$$5 \ \mu m < t1$$

where t1 is a thickness of said jacket layer.

9. An image fiber comprising:
an image transmitting portion including a plurality of cores and a cladding surrounding said cores;
a jacket layer higher in refractive index than said cladding, covering a periphery of said image transmitting portion; and
a coating layer covering a periphery of said jacket layer, impregnated with a light absorbing material,
said image fiber satisfying a condition:

$$t1 + t2 < 0.1 \ D$$

where t1 is a thickness of said jacket layer, t2 is a thickness of said coating layer, and D is an outer diameter of said image fiber.

10. An image fiber according to claims 6 or 7, satisfying a condition:

$$n_1 > n_3 > n_2$$

where $n_1$ is a refractive index of said cores, $n_2$ is a refractive index of said cladding, and $n_3$ is a refractive index of said jacket layer.

11. An image fiber according to claim 10, satisfying a condition:

$$n_1 - n_3 > n_3 - n_2$$

where $n_1$ is a refractive index of said cores, $n_2$ is a refractive index of said cladding, and $n_3$ is a refractive index of said jacket layer.

12. An image fiber according to claim 1, wherein said coating layer contains a light absorption material.

13. An image fiber comprising:
an image transmitting portion including a plurality of cores and a cladding surrounding said cores;
a jacket layer higher in refractive index than said cladding, covering a periphery of said image transmitting portion; and
a coating layer covering a periphery of said jacket layer, impregnated with a light absorption material,
said fiber satisfying a condition:

$$0.1 \ Wt \ \% < \alpha < 8 \ Wt \ \%$$

where $\alpha$ is a carbon content (Wt %).

* * * * *